United States Patent
Noto et al.

(10) Patent No.: US 6,812,993 B2
(45) Date of Patent: Nov. 2, 2004

(54) OPTICAL MULTIPLEXER AND CROSS-SWITCH USING ETCHED LIQUID CRYSTAL FABRY-PEROT ETALONS HAVING ENHANCED SPECTRAL RESOLUTION AND TRANSMISSION CHARACTERISTIC

(75) Inventors: John Noto, Ayer, MA (US); Robert B. Kerr, Shirley, MA (US); Hailiang Zhang, Lowell, MA (US); William Z. Marder, Pennington, NJ (US); Anthony C. Warren, New Hope, PA (US)

(73) Assignee: Scientific Solutions, Inc., North Chelmsford, MA (US)

( * ) Notice: Subject to any disclaimer, the term of this patent is extended or adjusted under 35 U.S.C. 154(b) by 0 days.

(21) Appl. No.: 10/404,417

(22) Filed: Apr. 1, 2003

(65) Prior Publication Data

US 2003/0206267 A1 Nov. 6, 2003

Related U.S. Application Data

(62) Division of application No. 09/775,970, filed on Feb. 2, 2001, now abandoned.
(60) Provisional application No. 60/220,682, filed on Jul. 25, 2000.

(51) Int. Cl.[7] .......................... G02F 1/13; G02F 1/1347; G02F 1/1335
(52) U.S. Cl. .......................... 349/198; 349/74; 349/86; 349/113
(58) Field of Search .......................... 349/198, 86, 74, 349/113

(56) References Cited

U.S. PATENT DOCUMENTS 4,756,606 A 7/1988 Jewell et al.
4,779,959 A 10/1988 Saunders
4,917,476 A 4/1990 Makh et al.

(List continued on next page.)

FOREIGN PATENT DOCUMENTS

EP 0 498 375 8/1992

OTHER PUBLICATIONS

Katsuhiko Hirabayashi et al. 1993. Tunable Liquid–Crystal Fabry–Perot Inteferometer Filter for Wavelength–Division Multiplexing Communication Systems. Journal of Lightwave Technology. vol. 11(12): 2033–2043.

Katsuhiko Hirabayashi et al. 1992. Tunable Wavelength–Selective Demultiplexer Using a Liquid–Crystal Filter. IEEE Photonics Technology Letters. vol. 4(7): 737–740.

(List continued on next page.)

*Primary Examiner*—Huyen Ngo
(74) *Attorney, Agent, or Firm*—Roberts Abokhair & Mardula LLC

(57) ABSTRACT

A novel aspect of the invention is a structural arrangement to widen a Fabry-Perot gap beyond a 100-micron LC thickness. The widening permits greatly enhanced spectral discrimination (i.e. many more WDM channels) across the device response range, which is expanded to ITU standards by use of a twin etalon configuration. A liquid crystal optical multiplexer according to the present invention is a two-etalon Fabry-Perot laser etched into many (>100) sub-etalons in a rectangular array. Each sub-etalon is independently tunable and can be coupled to a distinct fiber. Any single sub-etalon or random combination of sub-etalons is free to be tuned to a particular wavelength corresponding to one of the input channels. This allows for any combination of signals (i.e. digital video, data and voice) in a signal broadband channel to be switched to any of several receivers. Wavelength division multiplexing (WDM) is used to combine or separate individual types of signals from a single fiber. Phase-matching coatings are used on the materials within the Fabry-Perot gap, thereby enhancing transmission performance of the WDM device.

10 Claims, 11 Drawing Sheets

U.S. PATENT DOCUMENTS

| | | | |
|---|---|---|---|
| 5,050,954 A | | 9/1991 | Gardner et al. |
| 5,068,749 A | | 11/1991 | Patel |
| 5,111,321 A | * | 5/1992 | Patel ........................... 349/198 |
| 5,119,454 A | | 6/1992 | McMahon |
| 5,150,236 A | * | 9/1992 | Patel ........................... 349/198 |
| 5,168,383 A | * | 12/1992 | Iwaki et al. ................. 349/198 |
| 5,185,754 A | | 2/1993 | Craig et al. |
| 5,321,539 A | * | 6/1994 | Hirabayashi et al. ....... 349/198 |
| 5,561,523 A | | 10/1996 | Blomberg et al. |
| 5,781,268 A | | 7/1998 | Liu et al. |
| 5,784,507 A | | 7/1998 | Holm-Kennedy et al. |
| 6,271,899 B1 | * | 8/2001 | Lewis et al. .................. 349/86 |

OTHER PUBLICATIONS

W.J. Gunnig, Poohl Yeh. Multiple–Cavity Infrared Electro–Optical Tunable Filter Active Optical Devices (1979) vol. 202; pp. 2–15 and 21–25.

W. Gunning, J. Pasko, J. Tracy. A Liquid Crystal Tunable Spectral Filter: Visable and Infrared Operation; Imaging Spectroscopy (1981) vol. 268 pp. 190–194.

W. Schneller, J. Noto, R. Doe. Liquid Crystal Fabry–Perot Etalons. Part of the SPIE conference on Optical Astronomical Instrumentation (1998) vol. 3355; pp. 877–883.

* cited by examiner

OPTICAL MULTIPLEXER AND CROSS-SWITCH USING ETCHED LIQUID CRYSTAL FABRY-PEROT ETALONS HAVING ENHANCED SPECTRAL RESOLUTION AND TRANSMISSION CHARACTERISTIC

CROSS REFERENCE TO RELATED APPLICATIONS

This application is a divisional of application Ser. No. 09/775,970, filed Feb. 2, 2001, now abandoned, which claims benefit under 35 U.S.C. §119(e) from provisional application No. 60/220,682, filed Jul. 25, 2000. The No. 60/220,682 and 09/775,970 applications are both incorporated by reference herein, in their entirety, for all purposes.

INTRODUCTION

The present invention relates generally to the fields of optical network communications and optical switching. More particularly, the invention relates to multiplexing and cross switching of digital signals in an optical communications network.

BACKGROUND OF THE INVENTION

Optical transport has become an important data channel medium. From the advent of fiber-optic long distance telecommunications in the 1980's to the extensive optical fiber information distribution infrastructure investments currently being made, there has been an insatiable demand for the great bandwidth promised by optical transport.

Some of the workhorses of optical communications technology are the Wavelength Division Multiplexing (WDM) multiplexers and demultiplexers. WDM multiplexing has been used to provide multiple communication channels of transmission (MUX) or reception (DEMUX) within a single optical fiber carrying a broad wavelength signal. Multiple channels of transmission or reception are accomplished by isolation of narrow wavelength regimes within the broad, transmitted passband. If, in addition, the device used to select a narrow wavelength region, or channel, can be selectively tuned to any narrow region within the passband, then two such devices in series establish a complete optical cross-connection (or cross-switch).

Optical WDM according to the prior art is obtained using miniature diffraction gratings coupled to fibers or bundles of optical fibers. The maximum number of channels currently available in a WDM system is about 24. Using recently developed echelle grating technology, there exists the potential to increase that to 40–80 channels. Although these are impressive improvements, it would certainly be useful to produce a WDM system with over one hundred channels. Unfortunately that is not available in the prior art.

Basic liquid crystal Fabry-Perot (LCFP) etalon technology has been known for some time. And it has been known to make an LCFP etalon tunable. However, prior art optical WDM systems have not usefully exploited LCFP etalon technology.

As a preliminary matter, the basic aspects of LCFP etalon technology is reviewed as follows. Referring to FIG. 1, a cross section view of a liquid crystal-filled Fabry-Perot etalon according to the prior art is illustrated. A first etalon substrate 102 and a second etalon substrate 104 are spaced apart from one another. The etalon substrates 102, 104 are typically formed of fused silica. Precision-dimensioned spacer beads 122, 124 define the spacing between the etalon substrates 102, 104. Dielectric reflector layers 106, 108 are coated onto each of respective opposed faces of the etalon substrates 102, 104.

Transparent conductor layers 110, 112 are also coated onto the substrates 102, 104. The top coating layers on each of the substrates 102, 104 are polyimide alignment layers 114, 116. After coating, the polyimide is buffed to provide alignment functionality. A liquid crystal material 130 is filled in between the substrates 102, 104.

Basic LCFP arrangements were first described in the late 1970's by W. J. Gunning and P. Yeh. For specifics, refer to Gunning and Yeh "Multiple-Cavity Infrared Electro-Optic Tunable Filter", SPIE Proc., 202, 21–25 (1979), and Yeh and Gunning SPIE Proc., 202, pp. 2–15 (1979). Other publications that show the subsequent development of this technology are Gunning et al., "A Liquid Crystal Tunable Filter: Visible and Infrared Operation", SPIE Proc., 268 (1981), and Maeda et al., "Electronically Tunable Liquid-Crystal-Etalon Filter for High Density WDM Systems", IEEE Photonics Technology Lett., 2 No. 11, (1990).

By applying current to the conducting layers 110 and 112, the liquid crystal (aligned by the polyimide layer) changes its orientation relative to the axis of light passed through the system, so that the index of refraction of the material within the etalon gap is electronically tunable. Because the wavelength of light being passed by a Fabry-Perot is a function of the refractive index in the etalon gap, the device may be scanned through wavelength or positioned to a calibrated wavelength by simple voltage tuning. This simple LCFP tunable filter is here improved upon and adapted for simultaneous passage of multiple wavelengths within narrow bands in a WDM or cross-switch configuration.

It has been proposed to use a tunable liquid crystal Fabry-Perot etalon as a light modulator. For details, refer to U.S. Pat. No. 4,779,959 to Saunders. A twisted-nematic LCFP device has been described that is tunable and polarization insensitive. For details refer to U.S. Pat. No. 5,068,749 to Patel. It has also been proposed to use a nematic LCFP as a tunable filter or as a light modulator. For details refer to U.S. Pat. No. 5,111,321 to Patel and U.S. Pat. No. 5,150,236 to Patel.

Tunable liquid crystal etalons, as described in the prior art, are not useful for WDM or cross-switching. There are salient limitations of the prior art that evidence this. First, the prior art LCFP etalons have limited spectral resolution, which limits the number of possible WDM channels. Second, in response to the limited spectral resolution, the Patel '236 patent enhances the reflectivity of the dielectric coatings to greater than 95%. Although this modification of the earlier, simple designs (specifically, those of Yeh and Gunning (1979), Gunning and Yeh (1979), and Gunning et al. (1981)) does enhance spectral resolution, it drastically sacrifices transmission performance. The enhanced reflectivity produces a longer photon path-length within the Fabry-Perot resonant cavity, intrinsic scattering and absorption losses are enhanced, and thus, overall LCFP etalon transmission is reduced. Furthermore, the scanning range of the LCFP etalon is not enhanced by the modifications taught by the Patel '236 patent, and the ultimate spectral resolution remains limited by Fabry-Perot etalon substrate parallelism and surface defects. Finally, the prior art does not explicitly detail the design of a multiple channel WDM device or a cross-switch.

The spectral resolution of a Fabry-Perot filter is determined by the thickness of the resonant gap between the etalon reflecting layers. The attainable resolution is given by $$\Delta\lambda = (\lambda^2/2\mu t)/F \qquad (1)$$

where λ is the sampled wavelength, $\mu$ is the refractive index of the material in the etalon gap, and t is the gap thickness. F is a quantity commonly called the finesse. Finesse depends upon the reflectivity of the dielectric coatings, the parallelism of the reflecting surfaces, and upon optical defects in the etalon glass substrates or in the medium between the plates. F is typically a value between 8–50 for plane parallel Fabry-Perot etalons.

A Fabry-Perot etalon using liquid crystal in the gap (according to the prior art) is limited to a maximum etalon gap (t) of only 30–100 microns, depending on the LC used. Larger gap spacings are not possible for the prior art LC etalon because the liquid crystal fractures if the gap exceeds 30–100 microns. In prior art, the etalon gap spacing is limited by the effective limit of the LC layer thickness. Thus, a liquid crystal etalon designed to permit larger gap spacing and hence improved spectral resolution is needed to allow the largest possible number of WDM channels.

It has been proposed to enhance the gap of an LCFP etalon for use in WDM. However, this proposal suffers from the disadvantages that it does not address cross-switching capability by parsing out the real estate of the transparent conducting layer, and that the design of the gap enhancement is mechanically unstable. For additional details, refer to U.S. Pat. No. 5,321,539 to Hirabayashi et al.

The International Telecommunications Union (ITU) has specified the wavelength bands beginning at 1528 nm (C-band) and 1884 (L-band) as telecommunications network standards (ITU standard G.692). The C-band specification is 1528 nm –1560 nm. In addition, the ITU has set 100 channels within each band as the WDM goal standard, although that number may soon be changed to 200 channels.

Thus, what is needed is a device that increases the number of WDM channels that can be isolated by existing devices, simultaneously establishes the cross-connection, and does so with a mechanically robust, solid-state device.

SUMMARY OF THE INVENTION

The present invention increases the number of WDM channels that can isolated by existing devices, simultaneously establishes the cross-connection, and does so with a mechanically robust, solid-state device.

It is an object of the present invention to provide an optical cross-connection capable of handling 100 or more channels.

It is also an object of the present invention to provide a WDM multiplexer/demultiplexer that can handle 100 or more channels.

It is another object of the present invention to use fused silica spacer plate and spacer posts between Fabry-Perot reflectors to provide an arbitrary increase in spectral resolution of a liquid crystal Fabry-Perot etalon.

It is still another object of the present invention to provide a substantial increase in transmission for a LC etalon by phase matching of coatings in the LC cell.

It is a further object of the present invention to provide a liquid crystal Fabry-Perot etalon with phase matched coatings used on all surface interfaces.

It is an additional object of the present invention to provide an LC etalon having multiple filters, or channels, on a single glass substrate.

The present invention expands the number of channels to more than 200, and uses an etched, liquid crystal Fabry-Perot (LCFP) as its fundamental optical component. This invention adapts the LCFP specifically for WDM and cross-switching, and germane prior art describes the LCFP. This invention is a device that provides better than 0.32 nm spectral resolution in the C-band (>100 channels), and is randomly tunable to any of those spectral resolution elements (channels) in less than 10 milliseconds.

The present invention adheres to ITU standards, by provision of a device that is able to simultaneously resolve and select for transmission 0.5 nm wavelength slices within a 100 nm C-band or L-band. The invention is configured as an arbitrary number of wavelength tunable LCFP filters etched upon one substrate. Etching to convert a single tunable LCFP filter to multiple filters on one substrate is a feature of the invention. This etched etalon is placed in series with a similar etalon, such that one etalon (the resolving etalon) defines the spectral resolution, while the second etalon (the suppression etalon) suppresses higher orders of the resolving etalon. So configured, the twin etalon system provides a 100 nm free spectral range, and 0.5 nm spectral resolution. The spectral resolution is enhanced relative to prior art by mechanical extension of the etalon gap—another aspect of this invention. The transmission of the twin etalon configuration is optimized by the use of phase-matched coatings and anti-reflection coatings—a third aspect of the invention.

The present invention overcomes the spectral resolution limitation of prior art devices by design of an air-liquid crystal or glass-liquid crystal hybrid etalon gap, while the spectral scanning distance is preserved by combination of multiple etalons in series. As such, the high reflectivity requirements of the prior art are avoided, and LCFP etalon transmission is not sacrificed by use of extremely high reflectivity. In addition, phase matching of reflective coatings and proper anti-reflection coatings within the etalon gap according to the present invention further optimize LCFP etalon transmission. The present invention also uses laser etching of the etalon's transparent conducting layer to achieve a multiple channel, tunable, WDM or cross-switch upon a single LCFP substrate.

The present invention establishes an air-liquid crystal or a glass-liquid crystal hybrid gap by mechanically enhancing the etalon gap.

BRIEF DESCRIPTION OF THE DRAWINGS

Additional objects and advantages of the present invention will be apparent in the following detailed description read in conjunction with the accompanying drawing figures.

DETAILED DESCRIPTION OF THE INVENTION

Figure 1:
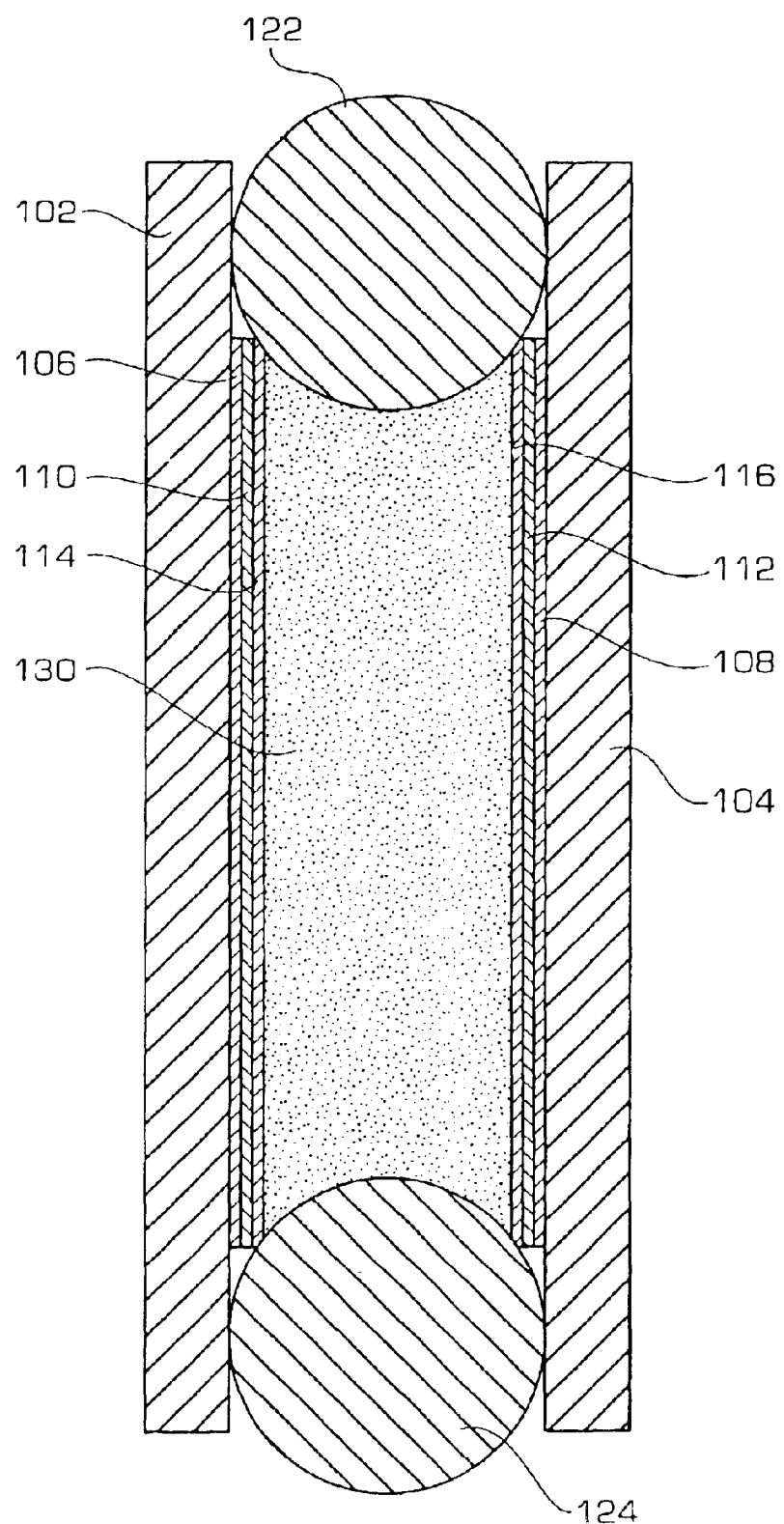
FIG. 1 illustrates a cross section view of a liquid crystal-filled Fabry-Perot etalon according to the prior art.

Nematic liquid crystals have optical anisotropy, or birefringence. They exhibit double refraction, wherein light polarized parallel to the director has a different index of refraction than light polarized perpendicular to the director. The director is along the same direction as the surface rubbing directions assuming that both the alignment surfaces are rubbed in the same directions, which is the case according to the present invention.

Nematic liquid crystals also show dielectric anisotropy, wherein the dielectric constants parallel and perpendicular to the director are not the same. The dielectric anisotropy introduces body torque on the molecules in the presence of an external field, which in turn gives rise to the director re-orientation. Under the external field, the director of the liquid crystal with a positive dielectric anisotropy tends to be aligned parallel to the external field, while the director of the liquid crystal with a negative dielectric anisotropy tends to be aligned perpendicular to the external field. The liquid crystal E44, used according to a preferred implementation of the present invention, has a positive dielectric anisotropy, but our the invention also encompasses the use of liquid crystal materials with negative dielectric anisotropy.

An AC electric field on the order of 2 kHz is used in order to avoid the separation and accumulation of free ions in the liquid crystals.

A Fabry-Perot etalon that exploits this variable index of refraction effect can be constructed by coating two fused silica plates with a transparent conductor and a broadband reflective coating. Increased spectral resolution can be achieved by creating etalons with both an LC cavity and a solid spacer or LC-solid spacer-air gap combinations. The total possible change of index of the LC under consideration is $\Delta n = 0.25$, which corresponds to a maximum possible change of wavelength of 158 nm ($\Delta \lambda \approx \lambda \Delta n$). Therefore, a thin layer of LC can allow tuning of many orders with a low resolution etalon, and up to several hundred orders with a medium to high resolution etalon.

For the perfect Fabry-Perot etalon (one with no defects) the intensity of light at the fringe plane is given by the expression, $$I(\delta, \lambda) = I_o(\lambda) \frac{1}{1 + (2F/\pi)^2 \sin(\delta/2)} \text{ with } \delta = \frac{4d\mu\pi\cos(\theta)}{\lambda} \quad (2)$$

where $\lambda$ is the wavelength, $I_O$ is the intensity at the center of each Hadinger fringe, d is the plate separation, $\theta$ is the angle measured from the plate normal and $\mu$ is the index of refraction of the material between the etalon plates. The finesse F, of the etalon is given by, $$F = \frac{\Delta \lambda}{\delta \lambda} \quad (3)$$

where $\Delta \lambda$ is the free spectral range and $\delta \lambda$ is the spectral resolution element, or the spectral width of the instrument function. The free spectral range (FSR) of a single Fabry-Perot etalon is given by:

$$\Delta \lambda = \sqrt{\frac{\lambda^2}{2\mu d}} \quad (4)$$

The angular acceptance or field of view of each order is given by $$\theta = 2\sqrt{\frac{\lambda}{dF}} \quad (5)$$

Here $\lambda$ is the center wavelength of the Fabry-Perot based filter, and $\delta \lambda$ is the full width half max (FWHM). The angular diameter of the central order of the Fabry-Perot can be calculated using eqn. 5. The linear size of an aperture designed to intercept the central order depends on the effective focal length (f) of the spectrometer system. The diameter of the central order at the focal plane is given by:

$$D_{ap} = 2f_0 \sqrt{\frac{\lambda}{dF}} \quad (6)$$

Thus, the linear diameter of the fringe is simply the angular diameter of the fringe multiplied by the focal length. A dual etalon configuration demonstrates high resolution and broad frequency agility. Utilizing the full ring produced by the Fabry-Perot etalon allows for much higher throughput than is available with a grating (Echelle or Czezny-Turner) spectrometer. The luminosity-resolution product (RL) of a Fabry-Perot etalon is given by $$RL = 2\pi(\text{Area}) \quad (7)$$

where the area used is the area of the etalon plate. This is several hundred times larger than the RL product for a grating spectrometer with the same spectral resolution, and with a grating of equal area to that of the Fabry-Perot etalon plates. Thus, a spectrometer system based on a Fabry-Perot etalon can reduce weight and size, while achieving spectral resolutions equal to or greater than those achievable with a grating system. These advantages are achieved in LC Fabry-Perot configurations with no moving mechanical parts.

The transmission of a perfect etalon is:

$$T = \left(1 - \frac{A}{1-R}\right)^2 \quad (8)$$

where T is the transmission, A is the absorption and R is the reflectivity of the dielectric reflector coating.

Whereas a prior art LCFP etalon achieves improved spectral resolution at the expense of transmission performance (by enhancing the finesse through the use of dielectric coatings with reflectivity greater than 95%), the present invention minimizes transmission losses. The transmission losses are minimized at a specified spectral resolution by removing the high reflectivity requirement, and by the application of phase-matched and anti-reflection coatings within the LCFP gap, so as to provide an overall transmission characteristic for the etalon of about 0.95 or greater. Thus, the present invention satisfies the need for high spectral resolution and high transmission in a WDM device.

Whereas no prior art LC etalon has the ability to perform tunable switching of multiple wavelength channels simultaneously, as required for a WDM device, the present invention creates multiple, independently tunable cells upon on single Fabry-Perot substrate. These multiple cells are created by laser etching of the conducting layer into multiple, distinct pixel cells. Each cell is independently tunable to individual wavelengths. The result is an all-optical, multiple wavelength switch of signals (either analog or digital) by wavelength division multiplexing using a solid state tunable device.

An LC optical multiplexer according to the present invention is a twin Fabry-Perot etalon laser etched into many sub-etalons in a rectangular array. Each sub-etalon is independently tunable and can be coupled to a fiber. Any single etalon or random combination of etalons can be tuned to a particular wavelength corresponding to one of the input channels. This allows for any combination of signals (i.e., digital video, data and voice) in a signal broadband channel to be switched to any of several receivers. In addition, wavelength division multiplexing is used to combine or separate individual types of signals from a single fiber. An LC optical cross-switch is accomplished by positioning a first LC multiplexer to sort broadband input by prescription, and a second multiplexer to select wavelengths after re-mix of the wavelengths defined by the first multiplexer.

One feature of the present invention is the use of phase-matching coatings on the materials within the Fabry-Perot gap, thereby enhancing the device throughput by roughly 10-fold over prior art LC Fabry-Perot devices that do not discuss this throughput limitation.

Another feature of the present invention is etching of the conducting layer material so that a single LC cell is converted into multiple cells each acting independently. Each element is tunable independent of other cells by independent electronic control of the refractive medium in each cell.

Still another feature of the present invention is the use of mechanical techniques to widen the Fabry-Perot gap beyond a 100-micron LC thickness limit. That widening permits greatly enhanced spectral discrimination (i.e. many more WDM channels) across the device response range.

Another feature of the invention is expansion of the scannable spectral passband by placing two LCFP etalons in series. Combination of enhanced free spectral range and enhanced spectral resolution permits tunable selection of more than 100 spectral regions within the telecom pass band defined by ICU standards. For example, an LC multiplexing system is useful to select just the data component of a broadband channel and switch that among one or several sub-networks. That switching is made entirely arbitrary by use of a second multiplexer at the distribution end of a cross-switch system.

The present invention provides the following advantages over prior art describing WDM devices and optical cross-switches:

Elimination of any need for opto-electronic conversion

Expansion of wavelength channel selectivity to more than 100

All permutations of the defined input-output wavelengths are selectable

Low power requirements

No manual tuning is required

Maximized optical throughput

Arbitrarily narrow bandpass (i.e., spectral resolution)

All solid state, mechanically robust design

A system developed according to the present invention uses two liquid crystal Fabry-Perot (LCFP) etalons in series and has 100–200 WDM channels in its simplest manifestation. According to alternate embodiments where the LCFP etalons are coupled with high order sorting filters or where three etalons are configured in combination, the number of channels is in the thousands.

A system according to the present invention is tunable, unlike static grating systems. Static grating systems transmit specified wavelengths (channels) as a spatial function of grating spacing and grating reflection, which is fixed at manufacture. An LCFP etalon-based device is free to be tuned to transmit any wavelength within its pass band to a particular spatial location.

Finally, the LCFP etalon device is entirely solid state, with no moving parts. Spectral tuning is accomplished by low current (~ micro-amps) electronic control of the refractive medium (liquid crystal) between the Fabry-Perot reflectors. In this way the LCFP etalon is superior to other WDM switching devices now in use.

A first embodiment of the present invention is represented by an optical wavelength division multiplexing device that implements aspects of the present invention. This WDM device embodiment may be implemented various ways.

One implementation of the WDM device (first) embodiment is via placement of two LC Fabry-etalons in series, thereby establishing an optical multiplexing device with sufficient free spectral range and spectral resolution to cover the ITU standard telecom band pass, while retaining sufficient spectral resolution to achieve more than 100 resolvable wavelength channels. The optical multiplexing device includes a first liquid crystal Fabry-Perot etalon and a second liquid crystal Fabry-Perot etalon. The first and second liquid crystal Fabry-Perot etalons are optically coupled together in series with one another.

A second embodiment of the present invention is represented by an optical cross-switch that implements aspects of the present invention. This cross-switch embodiment may be implemented various ways.

One implementation of the cross-switch (second) embodiment is via an optical cross-switch formed by placing two WDM multiplexing devices in series. One multiplexing device acts as wavelength selective transmitter, and a second acts as a simultaneous multi-wavelength optical receiver. Each transmitter and receiver is a multiplexing device, and each in turn is composed of a pair of LC Fabry-Perot etalons.

A third embodiment of the present invention is represented by a liquid crystal Fabry-Perot etalon that implements aspects of the present invention. This etalon embodiment may be implemented various ways.

One implementation of the etalon (third) embodiment is via a liquid crystal Fabry-Perot etalon with a resonant gap expanded by mechanical inclusion of a hybrid glass-LC spacing. The etalon has a first substrate coated on a first side with a first transparent conductor layer, a first reflector layer being disposed over the first transparent conductor layer on the first side of the first substrate, and an alignment layer being disposed over the first transparent conductor layer on the first side of the first substrate. The etalon also has a spacer plate coated on a first side with a second transparent conductor layer, the first side of the spacer plate facing the first side of the first substrate, and the spacer plate having a second side opposite its first side. Plural spacers are disposed between the first substrate and the spacer plate to define a predetermined gap between the first substrate and the spacer plate, and liquid crystal is filled in between the first substrate and the spacer plate. The etalon further includes a second substrate coated on a first side with a second reflector layer, the first side of the second substrate facing the second side of the spacer plate.

A second implementation of the etalon (third) embodiment is via a liquid crystal Fabry-Perot etalon with multiple, independently tunable resonant cells established by etching of the elctronic conducting layer, and independent electronic control of the refractive index in each cell. The etalon includes a first substrate coated on a first side with a first transparent conductor layer, a first reflector layer being disposed over the first transparent conductor layer on the first side of the first substrate, and an alignment layer being disposed over the first transparent conductor layer on the first side of the first substrate. The etalon also includes a second transparent conductor layer, liquid crystal filled in between the alignment layer and the second transparent conductor layer, and a second substrate coated on a first side with a second reflector layer, the first side of the second substrate facing the first side of the first substrate. The first transparent conductor layer and the second transparent conductor layer are each etched so as to form multiple independent etalons.

A third implementation of the etalon (third) embodiment is via a liquid crystal Fabry-Perot etalon with a resonant gap expanded by mechanical construction of a hybrid air-glass-LC sandwich within the resonant cell. The etalon includes a first substrate formed of glass, a spacer plate formed of glass, liquid crystal disposed between the first substrate and the spacer plate, and a second substrate formed of glass, spaced apart from the spacer plate by an air gap.

A fourth implementation of the etalon (third) embodiment is via selective design and application of anti-reflective (AR) and phase matched coatings to the various surfaces of a liquid crystal Fabry-perot etalon. An AR coating specific to the ITU telecom pass band are applied to the initial (input) surface of the first etalon substrate. This first AR coating minimizes scattering loss at the air-glass interface. The reflector coating applied to the second surface (facing the resonant cavity) of the first etalon is formulated to include the second AR coating, and it minimizes scattering loss as light passes through the glass, conducting layer, reflective layer, polyamide, LC interface. In addition, this reflector coating is formulated such that phase shift upon reflection is minimized.

A third AR coating is disposed on a first side of the spacer plate, the first side of the spacer plate facing the liquid crystal. This coating minimizes loss by accounting for the index change as light passes through the LC, polyamide, conducting layer, glass interface. A fourth AR coating is applied to the on a second side of the spacer plate opposite, its first side. This coating minimizes loss as light passes the glass, air interface. A fifth coating is applied to the first surface of the second substrate (facing the resonant cavity). This is a reflector coating forming the second member of the facing Fabry-Perot mirrors. This reflector coating formula minimizes loss at the air, reflector, glass interface, and minimizes phase change upon reflection. Finally, a sixth AR coating, identical to the first AR coating, is applied to the second (output) side of the second etalon, minimizing loss at the glass-air interface.

A fourth embodiment of the present invention is represented by a method of constructing liquid crystal etalons.

According to one embodiment of the present invention, an LC etalon (or series of LC etalons) coupled to a fiber is used to select a single WDM channel and route it on a different fiber. The specific spectral channel that is coupled to the output fiber is electronically selectable with a switching time of a few milliseconds. With two etalons in series, one channel among more than 100 channels can be selected. Three etalons in series expands the channels to many hundreds, or thousands.

Figure 3:
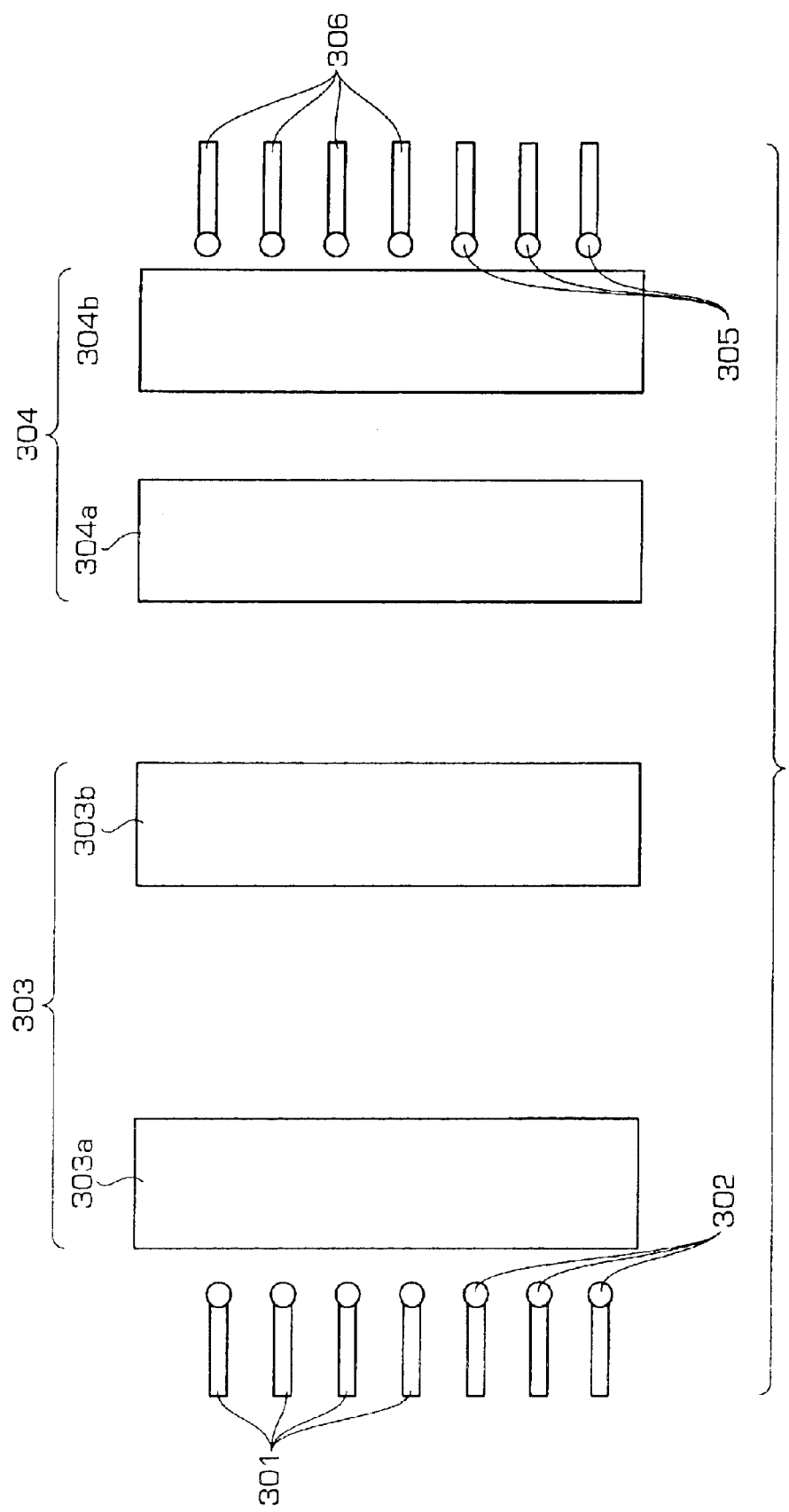
FIG. 3 illustrates an elevation view of the twin etalon WDM device of FIG. 2.
Figure 4:
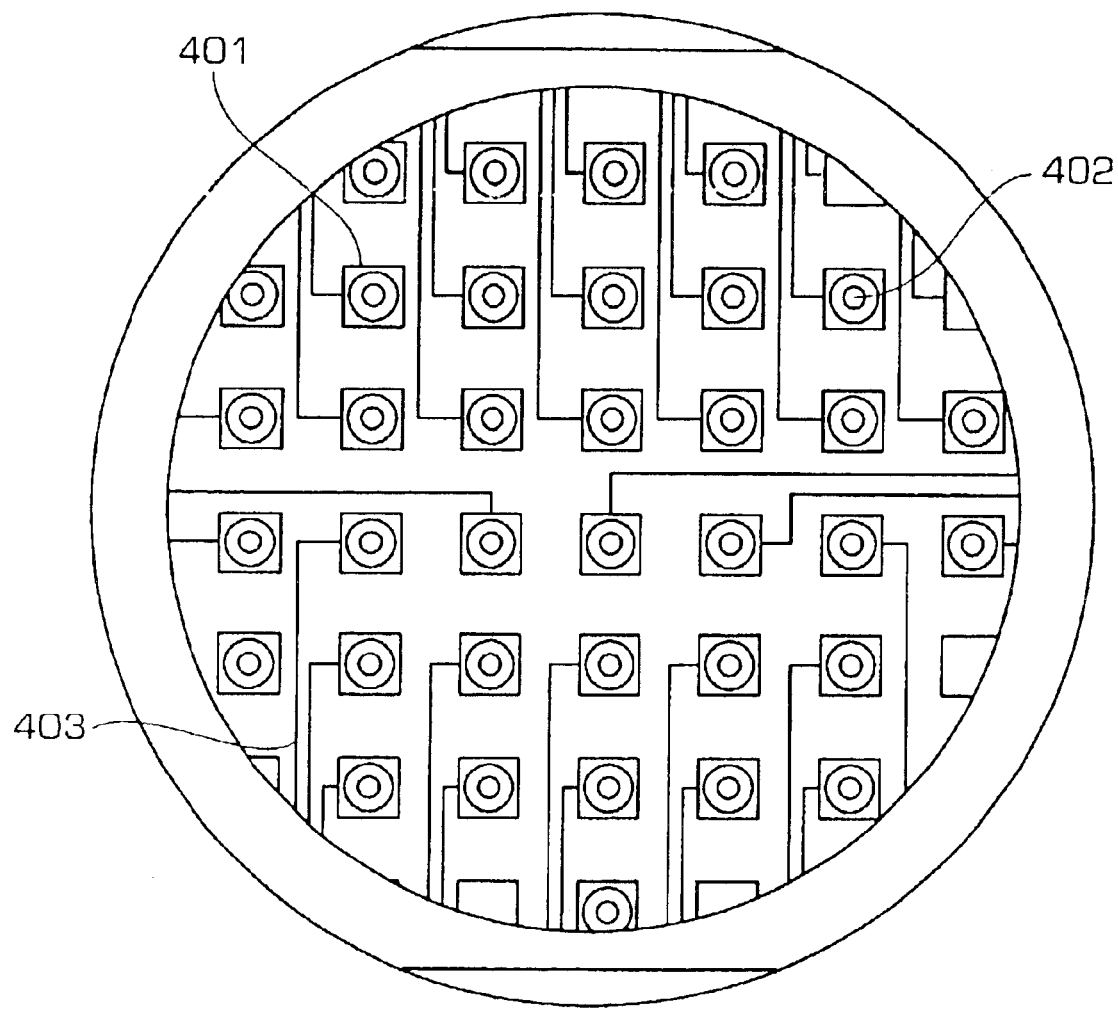
FIG. 4 illustrates an end-on view (along the optical path) of the WDM device of FIG. 2.

One technique to accomplish optical multiplexing is by using an array of etalons coupled to an input fiber or fiber bundle carrying a broadband signal (e.g. the ITU C-band). Each separate etalon in the array is free to select a WDM channel independently. This results in a device that can select a WDM channel from a fiber, while another etalon in the array can select another (or the same) channel. Each etalon in the array can be tuned to select any prescribed channel, any combination of channels can be selected by the array—resulting in an all-optical multiplexer that is electronically addressable. This WDM embodiment of the invention is illustrated in FIGS. 2 through 4.

Figure 2:
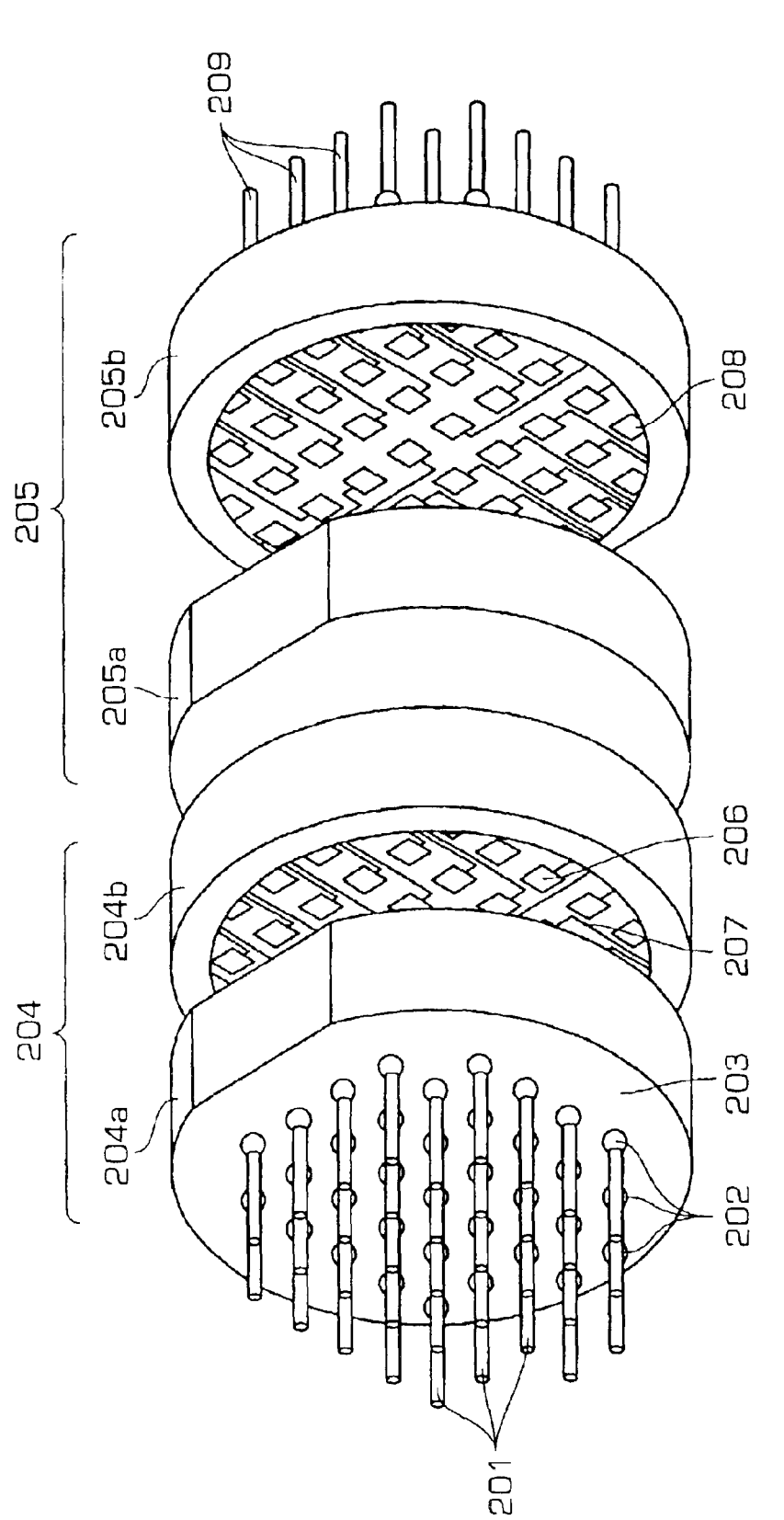
FIG. 2 illustrates a perspective view of a twin etalon WDM device according to the second embodiment of the present invention.

Referring to FIG. 2, a 35 channel LC Fabry-Perot WDM device according to the first embodiment of the present invention is illustrated. Multiple optical fibers, each carrying all wavelengths from a trunk fiber, include a sapphire cylindrical lens at their terminus to collimate light into the etalon assembly. The cylindrical lenses are epoxied to the surface of the first optical substrate. Each fiber is positioned above isolated etalon pixels, which are established by etching the conducting layer that is applied to the inside surfaces that surround the liquid crystal in each etalon gap. Each pixel is individually tuned by application of selected electric fields isolate from adjacent pixels by breach in the transparent conducting layer. Selected wavelengths from each pixel are passed from the second etalon through fibers attached to on the output side. Only 32 pixels are illustrated for clarity, but hundreds are possible. Two of these devices, when configured at each end of an optical circuit, form a complete optical cross-switch.

Broadband light enters the WDM device through multiple fibers 201 emanating from a trunk. (According to an alternate implementation, the light from the trunk is collimated and displayed across the entire aperture of the device.) Cylindrical collimating lenses 202 are epoxied to the ends of each of these input fibers, which in turn are attached to the input surface 203 of the first WDM etalon assembly. There are two etalons 204, 205 in the WDM device, and each etalon is composed of a pair of substrates. Two substrates 204a, 204b establish the suppression etalon 204, and another two substrates 205a, 205b establish the resolving etalon 205. Implementation details of the etalon gaps (i.e., material, etc.) are discussed infra with respect to FIGS. 7 and 8.

The etched conducting layer, establishing the square pixels 206 is shown on the surface of the second substrate member 204b, 205b of each etalon. These pixels are also present on the first substrate member 204a, 204b of each etalon, such that resonant cavities are established between each pixel pair separated by the respective etalon gap. Specific AC voltages applied to each pixel independently along wires 207 determine the wavelength passed by that pixel, since voltage determines the refractive index of the LC within the etalon gap. Because this is a two etalon series, pixels spatially aligned between the two etalons, e.g. pixels 206 and 208, are tuned electronically to the same wavelength. Ultimately, the light passing out of the device along fibers 209 is wavelength sorted according to any prescription, such that a particular fiber can transmit any resolution element within the bands pass (two fibers can contain the same resolution element), or can be tuned off-band to pass no light at all.

Referring to FIG. 3, a plan view of the WDM device according to the embodiment shown in FIG. 2 is illustrated. Here, the broadband input light arrives along fibers 301, and is collimated for presentation to the etalons using cylindrical collimating lenses 302. The suppression etalon 303 has two coated glass substrates 303*a*, 303*b* and the resolving etalon 304 has two coated glass substrates 304*a*, 304*b*. Note that the resonant cavity gap is narrower in resolving etalon 304 than in the suppression etalon 304. The selected wavelengths are focused by cylindrical lenses 305, which are attached to the output fibers 306 along which the output signals propagate.

Referring to FIG. 4, an end-on view of the WDM device according to the embodiment shown in FIG. 2 is illustrated, from a perspective along the optical axis. From this perspective, the observer views the WDM device through four glass substrates that make up the twin-etalon system. The etched pixels, the optical fiber interface, and the electronic connections are shown. LC pixels 401 are established by etched conducting layers that are applied to the substrate surfaces facing the resonant cavities (or alternatively, to glass spacers within the resonant cavity). The cylindrical lenses 402 at the ends of input and output fibers are illustrated by the structures within these square pixels. Wires 403 leading to each pixel for voltage application are also illustrated.

Optical cross connection devices according to the prior art allow for only a one to one connection; i.e., one receiving channel can be coupled to only one transmitting channel. In contrast, an etalon etched into a monolithic array (or an array of single etalons) according to the second embodiment of the present invention is useful to couple one transmitter to one receiver, or one transmitter to many detectors, or multiple transmitters to multiple detectors. This is all accomplished through electronic switching, with no mechanical adjustment required.

Figure 5:
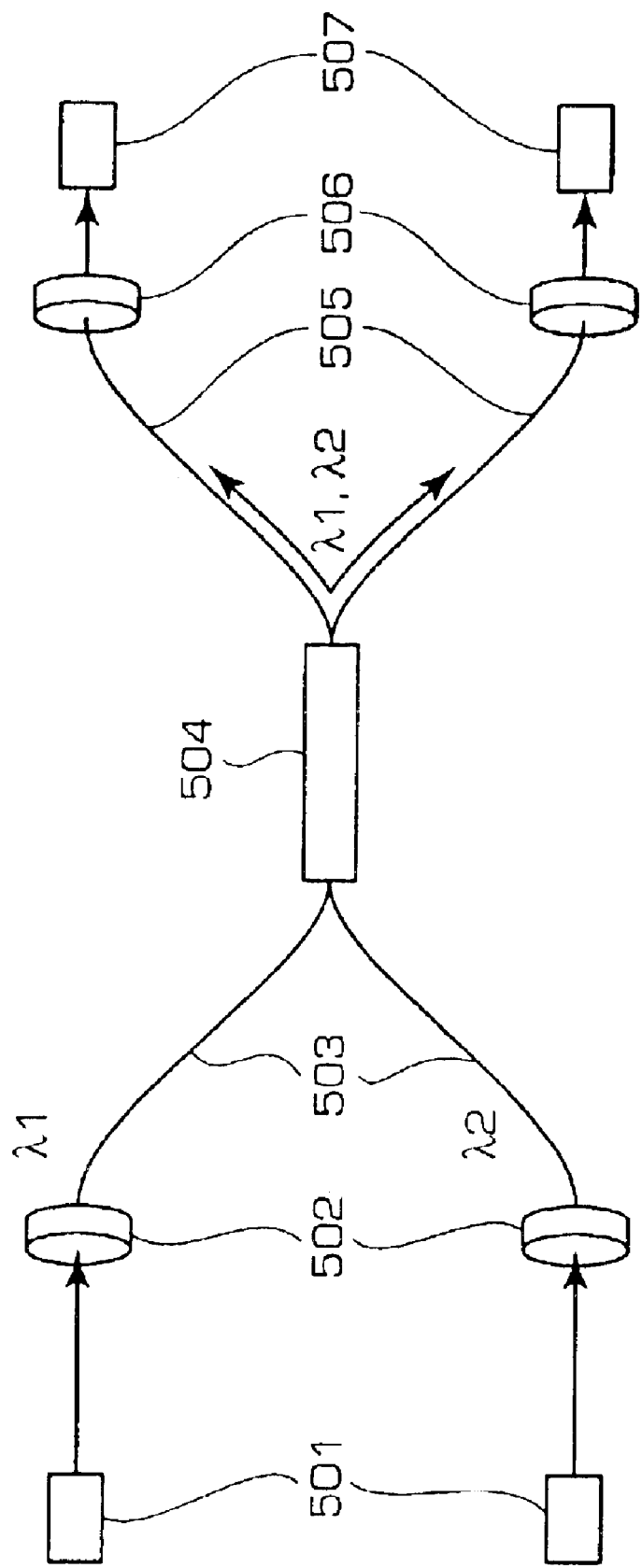
FIG. 5 illustrates a schematic representation of two WDM devices operating as a transmitter (left hand side) and a receiver (right hand side) to form a cross-switch according to the second embodiment of the present invention.

Referring to FIG. 5, a schematic view of a two channel cross-switch according to the second embodiment of the present invention is illustrated. For clarity, two pixels only of the WDM device are shown as two independent transmitters and two independent receivers. Wavelengths are selected from a broadband input trunk fiber to the transmitters. The transmitters are free to select and transmit any wavelength defined by their independent, electronically tuned LC Fabry-Perot resonant cavity. They are free to choose the same, or different wavelengths. Signals exiting the transmitters are subsequently mixed, and the receivers are tuned to select similar, dissimilar, or none of the transmitted wavelengths in pre-selected (here, two) channels.

Although only two channels are illustrated for clarity, many channels (>100) are possible. Broadband light enters the cross switch along fibers 501 (or the input may simply be optically displayed across the device). Single element LC Fabry-Perot filters 502 may also be pixel elements 502 of an etched multiple channel WDM filter as previously described. These elements 502 are electronically tuned to transmit selected wavelengths. These wavelengths are transmitted along fibers 503 into a mixer 504, which may be a simple as a bundle of the individual fibers emanating from the transmitters 502. Mixed wavelengths exiting the mixer 504 are carried along fibers 505, to receiver elements 506. These receiver elements 506 may be implemented as single channel LC Fabry-Perot filters, or may be implemented as individual pixels within an array etched onto a substrate as described previously. Each receiver element 506 may be tuned to any wavelength of the mixed transmitter signals for ultimate distribution to network clients 507. Receivers 506 may be tuned to the same wavelength as any other receiver element, to a different wavelength from any other receiver element, or to a wavelength that is not even a component of the mixed signal from the transmitter elements 502. This embodiment, thus forms a completely flexible, wavelength agile optical cross-switch.

Figure 7:
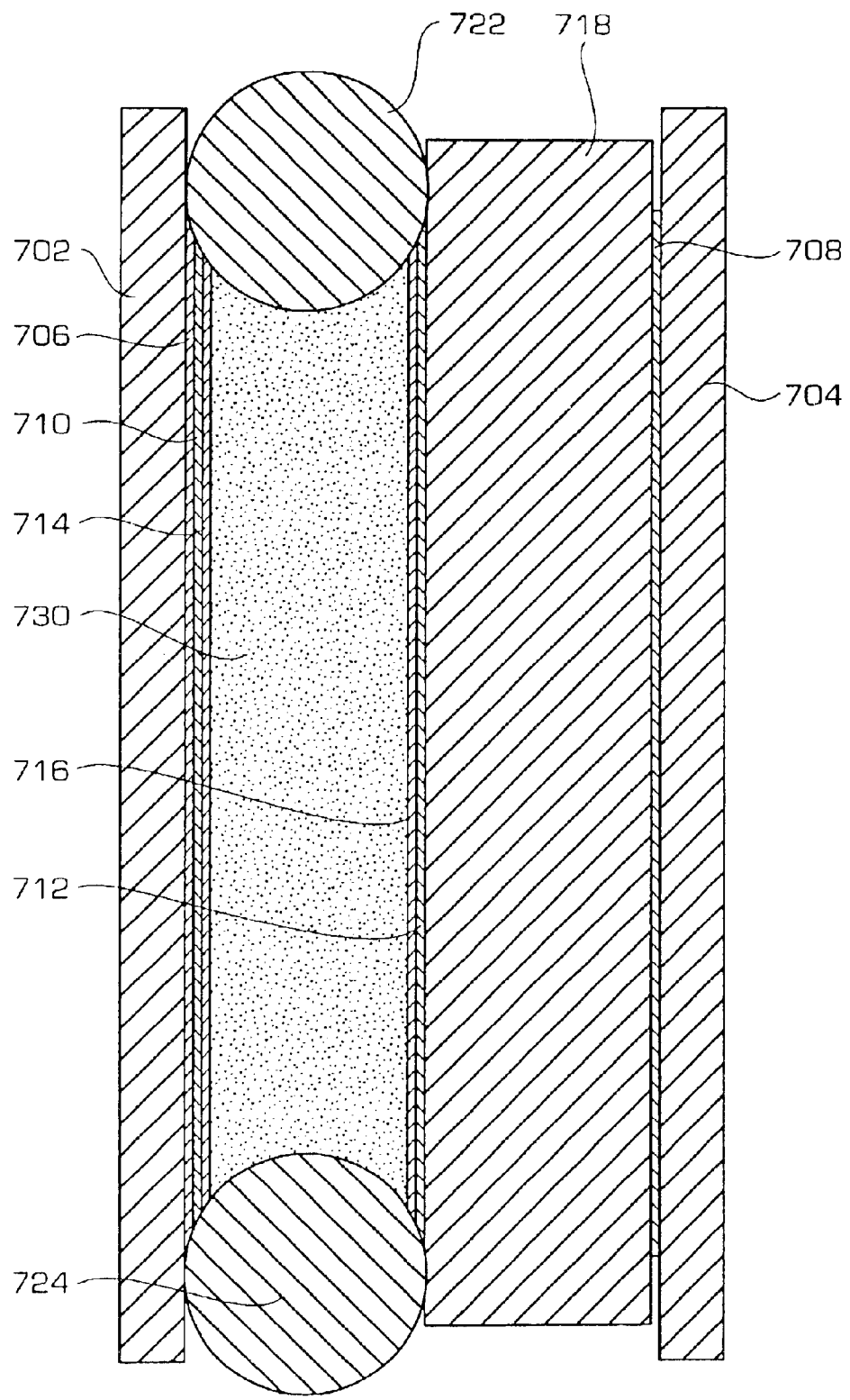
FIG. 7 illustrates a cross sectional view of a single liquid crystal-filled Fabry-Perot etalon according to the third embodiment of the present invention, with an enhanced gap width implemented via a hybrid glass plus LC gap.

Referring to FIG. 7, a cross sectional view of a single liquid crystal-filled Fabry-Perot etalon according to the third embodiment of the present invention is illustrated, with an enhanced gap width implemented via a hybrid gap of glass and liquid crystal. A first etalon substrate 702 and a second etalon substrate 704 are spaced apart from one another. The etalon substrates 702, 704 are preferably formed of fused silica. Low phase shift dielectric reflector layers 710, 708 are coated onto each of respective opposed faces of the etalon substrates 702, 704.

A spacer plate 718 is disposed between the first and second etalon substrates 702, 704. Precision-dimensioned spacer beads 722, 724 define the spacing between the first etalon substrate 702 and the spacer plate 718. The spacer plate 718 is preferably formed of fused silica, as are the spacer beads 722, 724.

A first transparent conductor layer 706 is also coated onto the first substrate 702, and a second transparent conductor layer 712 is coated onto the face of the spacer plate 718 facing the first substrate 702. The transparent conductor layers 706, 712 are preferably formed of Indium Tin Oxide (ITO). A preferred proportion of components in the ITO is 4% Tin to 96% Indium Oxide.

The top coating layers on the first etalon substrate 702, and on the spacer plate 718 are liquid crystal alignment layers 714, 716. The alignment layers 714, 716 are formed of polyimide (preferably SE7492 polyimide). After coating, the polyimide alignment layers 714, 716 are each buffed to provide alignment functionality. A liquid crystal material 730 is filled in between the first etalon substrate 702 and the spacer plate 718. E-44 liquid crystal is preferred.

Figure 6:
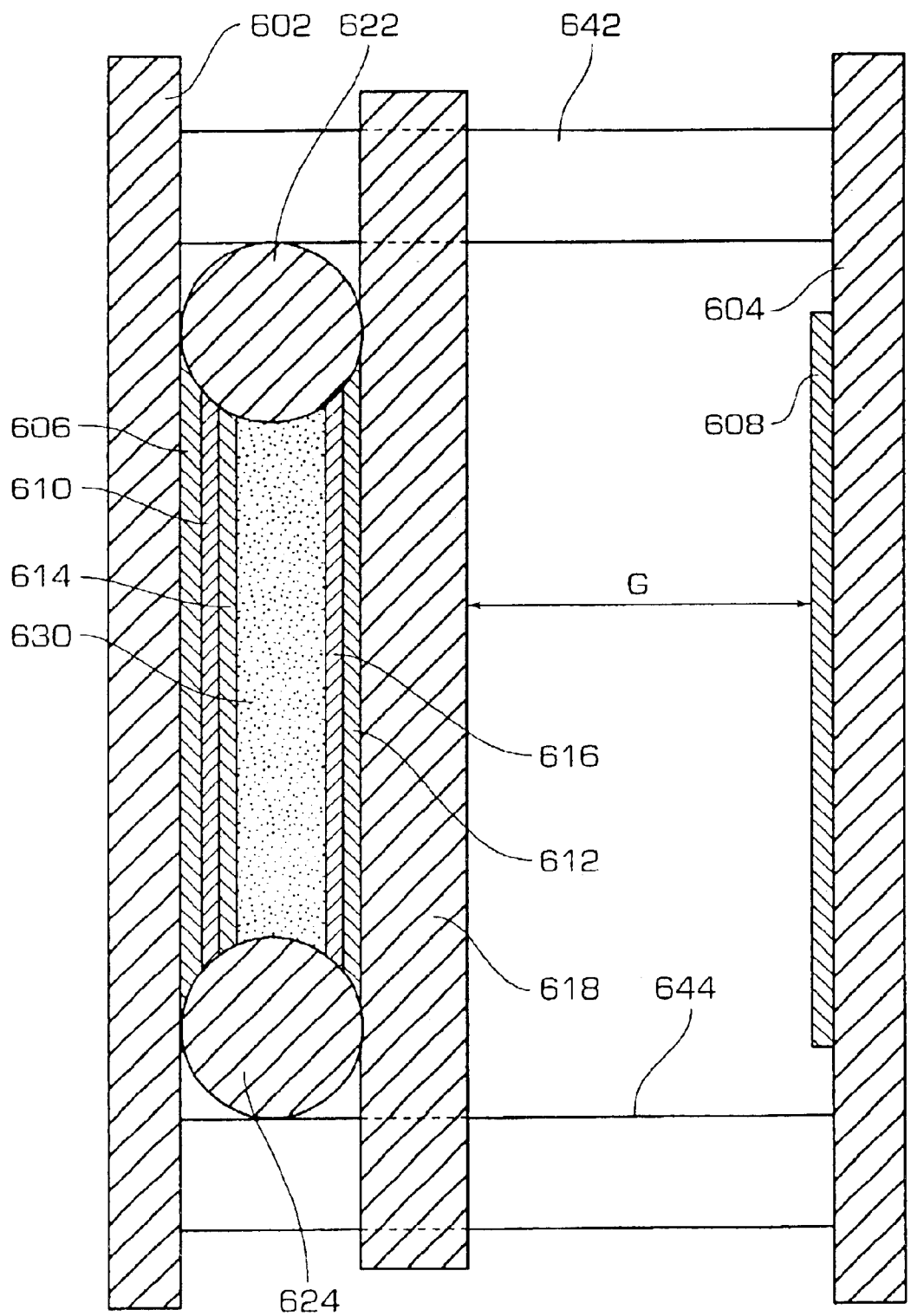
FIG. 6 illustrates a cross sectional view of a single liquid crystal-filled Fabry-Perot etalon according to the third embodiment of the present invention, with an enhanced gap width implemented via a hybrid air plus LC gap.

In the implementation illustrated by FIG. 7, the overall gap between the etalon substrate glass plates 702, 704 is augmented by inclusion of the high precision spacer plate 718. This gap augmentation permits higher spectral resolution measurements than is possible in a cell limited in gap width by the practical limit of liquid crystal (LC) thickness. Without the gap augmentation innovation, the largest gap thickness is approximately 100 microns. When this feature of the present invention is utilized it has been possible to manufacture gaps as large as 10 mm. Furthermore, larger gaps are possible. FIG. 6 illustrates an innovative aspect of the present invention wherein a precision glass spacer plate 718 is laminated to one of the etalon substrates 704, preferably using Norland NOA-68 UV adhesive. The reflector 708 coating remains beneath that lamination. The side of the spacer plate facing the LC includes the Indium Tin Oxide (ITO) layer 712 followed by a polyamide layer 716.

Referring to FIG. 6, a cross sectional view of a single liquid crystal-filled Fabry-Perot etalon according to the third embodiment of the present invention is illustrated, with an enhanced gap width implemented via a hybrid gap of air and liquid crystal. A first etalon substrate 602 and a second etalon substrate 604 are spaced apart from one another. The etalon substrates 602, 604 are preferably formed of fused silica. Low phase shift dielectric reflector layers 610, 608 are coated onto each of respective opposed faces of the etalon substrates 602, 604.

A spacer plate 618 is disposed between the first and second etalon substrates 602, 604. Precision-dimensioned spacer beads 622, 624 define the spacing between the first etalon substrate 602 and the spacer plate 618. The spacer plate 618 is preferably formed of fused silica, as are the spacer beads 622, 624.

Precision spacer posts 642, 644 define spacing dimension between the first and second etalon substrates 602, 604. The spacer posts 642, 644 are preferably formed of fused silica, are matched to ¼ wavelength in height, and are flat to ¹⁄₁₀ wavelength. The spacer plate 618 is notched to provide clearance for the spacer posts 642, 644.

A first transparent conductor layer 606 is also coated onto the first substrate 602, and a second transparent conductor layer 612 is coated onto the face of the spacer plate 618 facing the first substrate 602. The transparent conductor layers 606, 612 are preferably formed of Indium Tin Oxide (ITO). A preferred proportion of components in the ITO is 4% Tin to 96% Indium Oxide.

The top coating layers on the first etalon substrate 602, and on the spacer plate 618 are liquid crystal alignment layers 614, 616. The alignment layers 614, 616 are formed of polyimide (preferably SE7492 polyimide). After coating, the polyimide alignment layers 614, 616 are each buffed to provide alignment functionality.

A liquid crystal material 630 is filled in between the first etalon substrate 602 and the spacer plate 618. E-44 liquid crystal is preferred. Thus, the LC cell is bounded by a notched (to accommodate the spacer posts) spacer plate and by one substrate. The spacer-plate and substrate on the other side of the LC are preferably held in place as a cell by epoxy.

In the implementation illustrated by FIG. 6, a method providing particularly large gaps is illustrated. According to this implementation, precision spacer posts separate the substrates. Rather than laminating the spacer plate to one of the etalon substrates, a large air gap G is formed.

It is preferred to use optical materials (spacer balls, spacer plates, and spacer posts) of a precise character to best practice the present invention so as to provide preservation of good spectral clarity (finesse) in practicing the third embodiment.

As mentioned above, one feature of the present invention is the use of phase matching materials at the interfaces of the materials in the Fabry-Perot cavity. This feature maximizes the throughput of the device.

Figure 8:
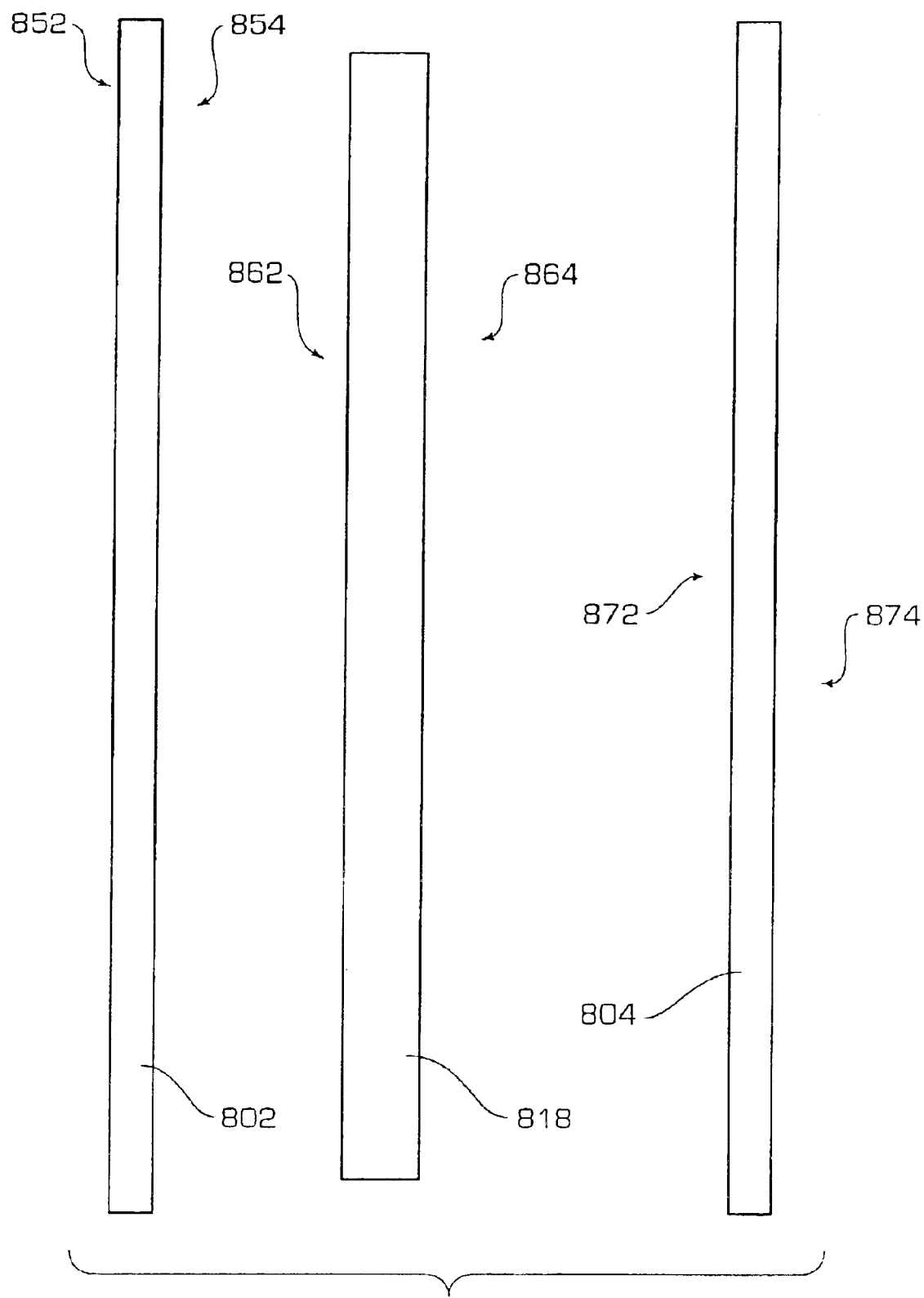
FIG. 8 illustrates a schematic view of coatings that are applied to various surfaces of a single Fabry-Perot etalon according to the present invention to optimize transmission when materials of differing refractive index are present within the resonant cavity.

Referring to FIG. 8, anti-reflective (AR) phase matching coatings applied to the surfaces are illustrated. These coatings minimize Fresnel losses when light passes each interface. Because the Fabry-Perot is a resonant cavity, small losses at each interface, after several reflections within the gap, can destroy throughput of the device. (This has always been a limitation for LC Fabry-Perot devices.) The phase-matching coating designs include:

1) glass-to-air anti-reflection coatings 852, 874 at the outside of each of the etalon substrates 802, 804;
2) a reflector coating 872 disposed on an inside surface of the isolated etalon substrate 804, which incorporates into its design formula passage of light from the glass substrate 804, into air;
3) an anti-reflection coating 864 for air-to-glass at the interface of the spacer plate 818 to the air;
4) an anti-reflection coating 862 applied to the LC side of the spacer plate 818 (This coating design formula approximates ITO, polyamide, and LC as thin films at the glass-to-LC interface);
5) a reflector coating 854 at the substrate-to-LC interface (This reflector coating design approximates ITO as a thin film layer between the reflector coating and the glass substrate, and further approximates polyamide and LC as thin film layers on the LC side of the reflector coating).

Design recipes for phase matching coatings according to embodiments of the present invention are discussed as follows. Table 1 details a layering configuration for an anti-reflective coating according to the present invention.

TABLE 1

| Material | Thickness (nm) |
| --- | --- |
| ITO | 12.50 |
| MgF₂ | 75.00 |
| ZrO₂ | 21.91 |
| MgF₂ | 65.31 |
| ZrO₂ | 11.93 |
| Nylon | 100.00 |

Table 2 details a layering configuration for a reflective coating according to the present invention.

TABLE 2

| Material | Thickness (nm) |
| --- | --- |
| ITO | 9.09 |
| TiO₂ | 64.59 |
| SiO₂ | 66.55 |
| TiO₂ | 45.95 |
| SiO₂ | 110.96 |
| TiO₂ | 66.41 |
| SiO₂ | 113.07 |
| TiO₂ | 64.62 |
| SiO₂ | 81.06 |
| TiO₂ | 42.32 |
| SiO₂ | 129.78 |
| TiO₂ | 96.10 |
| SiO₂ | 124.10 |
| Ag | 20.00 |
| SiO₂ | 129.30 |
| TiO₂ | 90.57 |
| SiO₂ | 132.01 |
| TiO₂ | 83.14 |
| SiO₂ | 158.21 |
| TiO₂ | 94.93 |
| Nylon | 72.73 |

Figure 9:
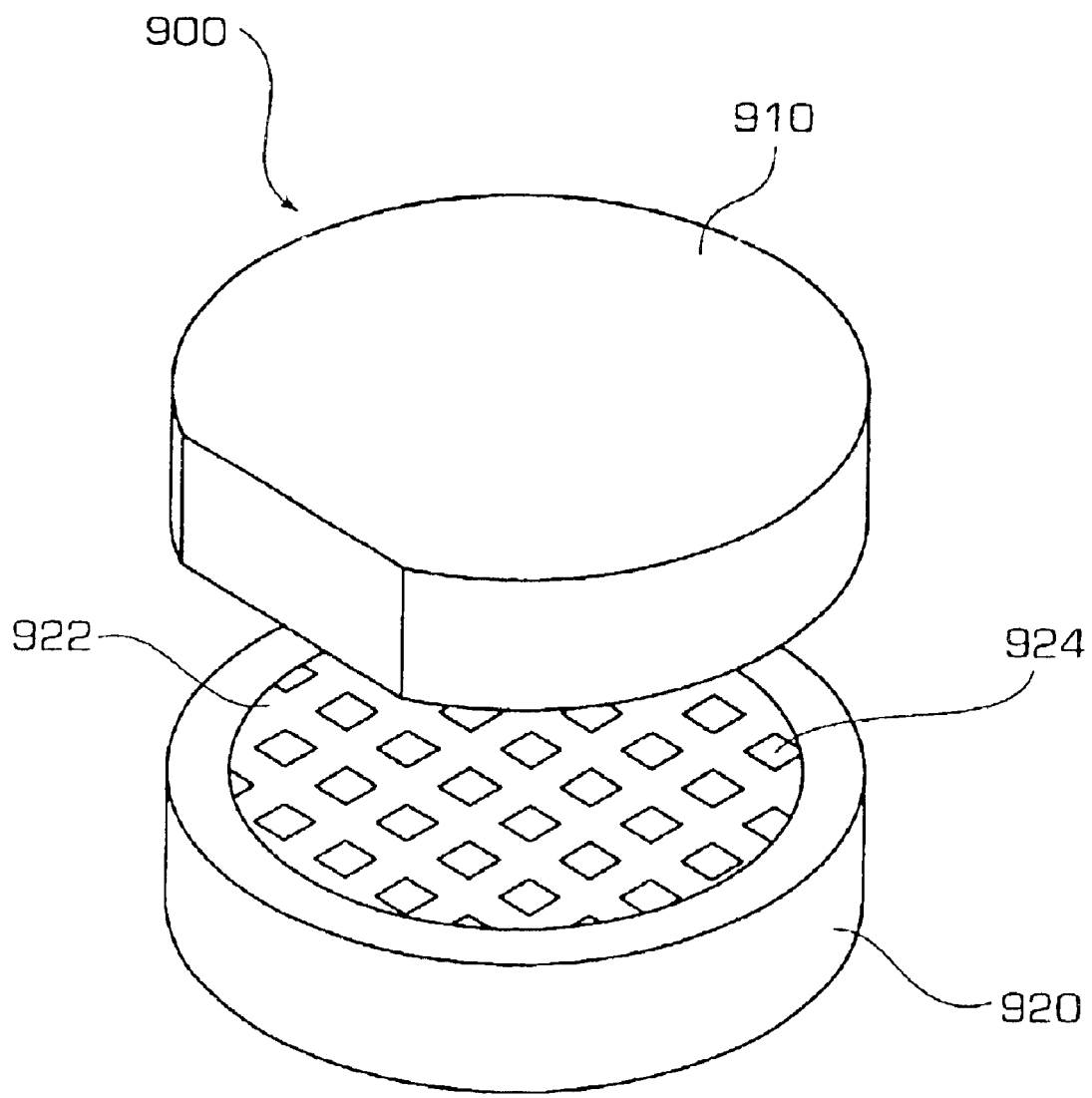
FIG. 9 illustrates a perspective view of a single etalon LC Fabry-Perot component stressing the ability to establish an array of individual LC cells on a single substrate, by etching the underlying conducting layer applied to the etalon substrate.

Referring to FIG. 9, a perspective view of etalon components according to an implementation of the third embodiment of the present invention is illustrated. A pair of etalon substrates 910, 920 of a single LC Fabry-Perot cell 900 is illustrated as being converted into multiple cells by etching the ITO on the surface of one plate 910 with a Nd-YAG laser. A grid pattern 922 is etched in the ITO layer to leave a matrix of isolated ITO cells 924. Each isolated ITO cell 924 is individually connected to a power supply, so that each LC region beneath particular ITO cells are subject to individualized electric fields. In this way, a single LC Fabry-Perot cell is converted to multiple small cells, each of which may be tuned to a specified spectral location, independent of other cells. This etching represents our third innovation to improve the flexibility and applicability of LC Fabry-Perot devices.

Connection of the isolated ITO cells 924 to electrical potential is accomplished by forming wiring runs on the etched grid 922 along with one or more ground planes. This wiring step in the cell fabrication process is accomplished using conventional techniques as are well understood by those of skill in the art.

A grid pattern is shown in FIG. 9 to illustrate the etch aspect of the present invention, because the squared grid pattern is preferred in order to maximize the number of etalons that may be fit on a substrate. However, the present invention is not limited to such a shape or arrangement. For example another advantageous pattern is a wedge pattern. Although the wedge pattern does not make as efficient use of space as does the square grid, it makes the task of wiring up the isolated ITO cells easier. Other patterns may also be advantageously used.

Each ITO layer in the preferred embodiment is a 4% tin, 125 nm thick layer recipe, preserving 99% transmission through the layer. Each polyamide layer is preferably composed of SE-7492 polyamide, hand-brushed to serve as the LC alignment layer, although other polyamide types can be used.

Figure 10:
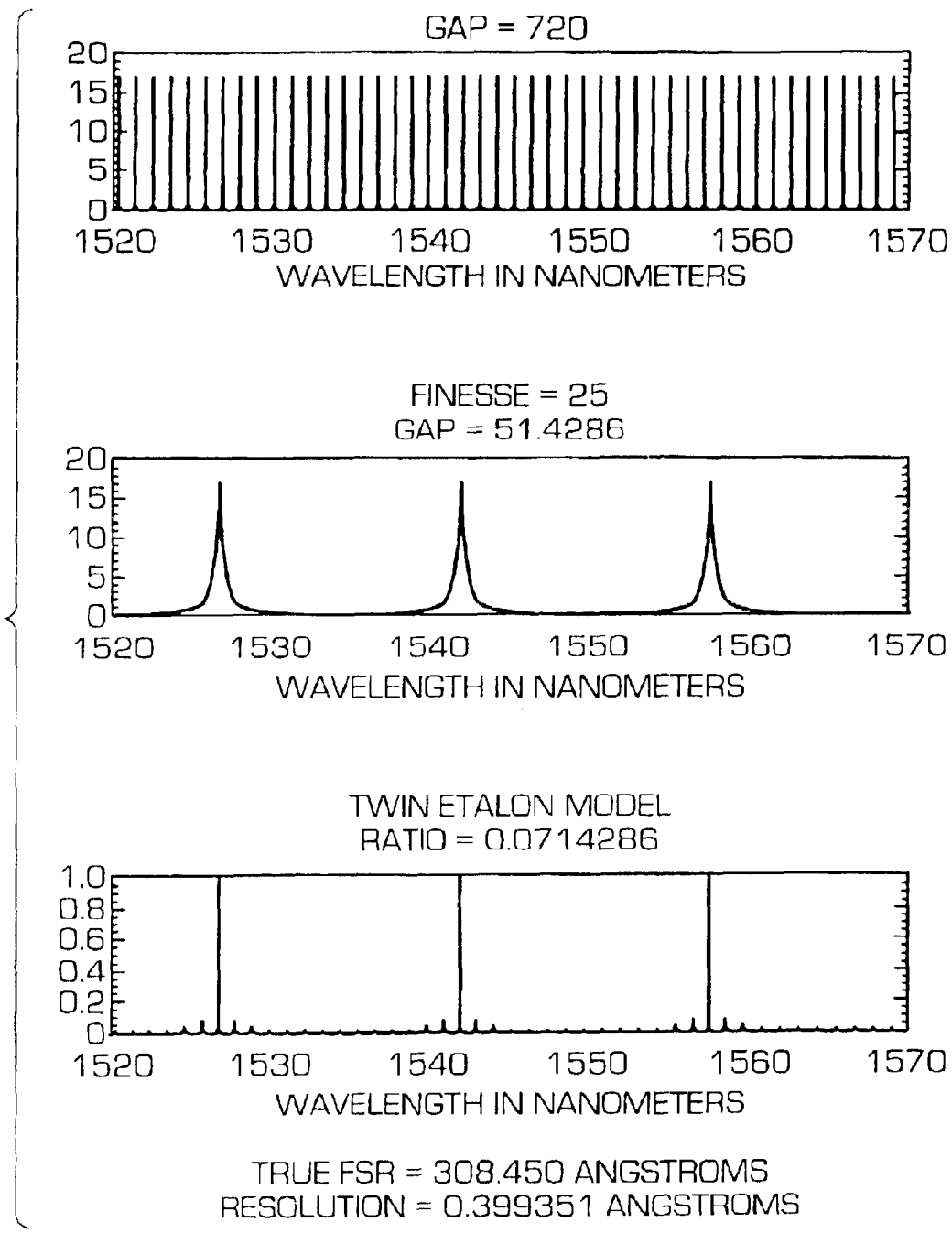
FIG. 10 illustrates the spectral response of a WDM etalon pair according to a first working example implementing a two-inch substrate.
Figure 11:
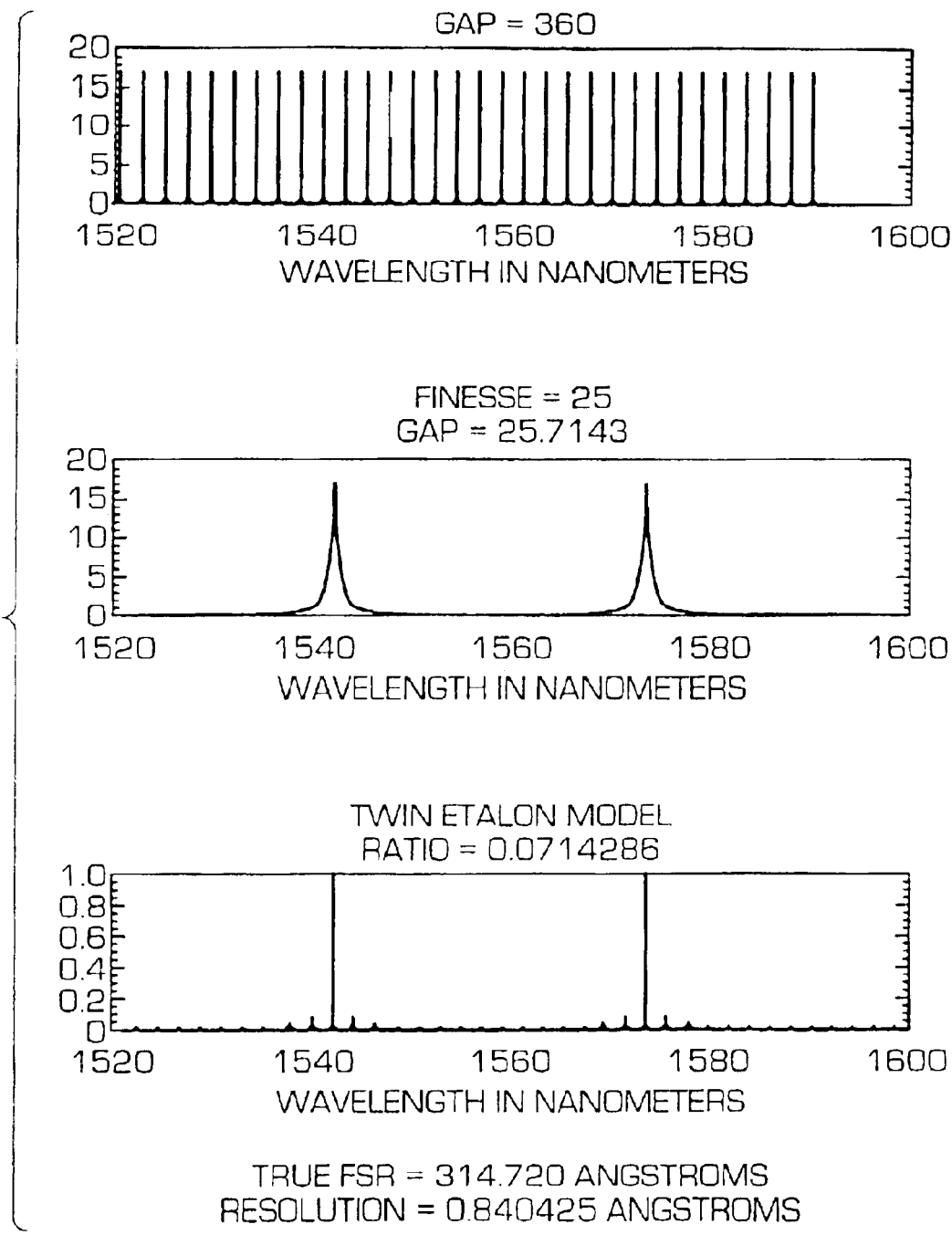
FIG. 11 illustrates the spectral response of a WDM etalon pair according to a second working example implementing a three-inch substrate.

Referring to FIGS. 10 & 11, the spectral responses for two gap configurations of two distinct, twin-etalon WDM device working examples are illustrated.

Referring to FIG. 10, the spectral response of a WDM device implementing a two-inch substrate according to a first working example is illustrated. In this first working example, the resolving etalon has a gap of 720 microns, and the suppression etalon has a gap of 51.43 microns. The top graph shows the spectral response for the resolving etalon alone, and the middle graph shows the spectral response for the suppression etalon alone.

Placed in series, constructive interference between the two etalons produces a free spectral range of 30.85 nm in the ITU C-band, and so configured, the WDM device includes more than 770 distinct spectral resolution elements, or WDM channels, each with a FWHM width of 0.04 nm. The overall spectral response for the WDM device is shown in the bottom graph.

Referring to FIG. 11, the spectral response of a WDM device implementing a three-inch substrate according to a first working example is illustrated. In this second working g example, the resolving etalon has a gap of 360 microns, and the suppression etalon has a gap of 25.71 microns. The top graph shows the spectral response for the resolving etalon alone, and the middle graph shows the spectral response for the suppression etalon alone.

Placed in series, constructive interference between the two etalons produces a free spectral range of 31.47 nm in the ITU C-band, and so configured, the WDM device includes more than 372 distinct spectral resolution elements, or WDM channels, each with a FWHM width of 0.08 nm. The overall spectral response for the WDM device is shown in the bottom graph.

Etalons embodied according to the present invention can be used in spectral imaging, spectral remote sensing, laser tuning, and telecommunications. These etalons can be placed in series and will act as a single etalon with a larger free spectral range. The invention provides a LC Fabry-Perot based filter fabricated with an arbitrary spectral resolution and the maximum possible transmission. A spacer plate, optionally in combination with spacer posts, is used to create an etalon of arbitrary gap. This results in spectral resolutions much higher than achievable using prior art LC Fabry-Perot etalons. Phase specific coatings are used to maximize transmission.

According to an alternate implementation, multiple emitters or transmitters, each in series with an individual etalon, are used to select which wavelength from the transmitters is coupled to the output optical fiber.

Construction procedure for making an LC etalon for use in a WDM device, according to a fourth embodiment, is described as follows. Construction of an LC etalon begins with a very flat and parallel fused silica substrate. Plates matched flat to $150^{th}$ of a wave of light at 633 nm are essential. These substrates are coated with a 12.5 nm thick layer of Indium Tin-oxide (ITO) (4% tin) that has 99% or better transmission at the wavelengths of interest on the flat side. After coating a Nd:YAG laser is used to etch a square grid (e.g. 12×12 pixels) into the ITO. The pattern must include a fine line to the edges to allow for soldering wires onto the etalon.

After etching, the etalon plates are coated with a high reflector, low phase variation coating. This coating is designed to have a constant phase even though it is bounded on one side by ITO and on the other by polyimide. Coating recipes for an LC etalon are discussed in detail below.

After etching the etalon plates are spin-coated with a polyimide-solvent mixture. This is a two step process. The etalon plates are spun and the polyimide mixture is applied, then the angular speed is increased for 30 seconds to ensure a thin coating of polyimide. The etalons are then baked at 160 degrees C. for 30 minutes to remove the solvent. The polyimide coated etalons are then buffed and the two plates are ready to be aligned into an etalon.

A mixture of optical epoxy in which small, fused silica spacers (3–20 microns thick depending on application) have been mixed is applied in a 1–2 mm ring around the substrate edges, leaving one or two openings for the LC to enter the cavity via vacuum filling or capillary action. The etalons are then placed into a 3-point alignment jig and placed on a monochromatic, Lambertian mercury lamp. Pressure is applied while observing the interference pattern, as the imaging device (camera, eye, photodetector) is moved perpendicular to the optical axis the interference pattern "breathes" expands and contracts, pressure is applied/removed to minimize this breathing. When the ring pattern is as stable as possible, the epoxy is then hardened with UVB radiation and the etalon is placed in a vacuum chamber and evacuated to 6 microns. A reservoir of LC-18349 (or other LC's) is placed next to the etalon and the etalon fills via vacuum filling or capillary action.

The present invention has been described in terms of preferred embodiments, however, it will be appreciated that various modifications and improvements may be made to the described embodiments without departing from the scope of the invention. The scope of the present invention is limited only by the appended claims.

What is claimed is:

1. A liquid crystal Fabry-Perot etalon comprising:

a first substrate coated on a first side with a first transparent conductor layer;

a first reflector layer disposed over the first transparent conductor layer on the first side of the first substrate;

an alignment layer disposed over the first transparent conductor layer on the first side of the first substrate;

a spacer plate coated on a first side with a second transparent conductor layer, the first side of the spacer plate facing the first side of the first substrate, the spacer plate having a second side opposite its first side;

plural spacers disposed between the first substrate and the spacer plate to define a predetermined gap between the first substrate and the spacer plate;

liquid crystal filled in between the first substrate and the spacer plate; and a second substrate coated on a first side with a second reflector layer, the first side of the second substrate facing the second side of the spacer plate;

wherein the second substrate is spaced a predetermined distance apart from the spacer plate.

2. A liquid crystal Fabry-Perot etalon comprising:

a first substrate formed of glass;

a spacer plate formed of glass;

liquid crystal disposed between the first substrate and the spacer plate;

a second substrate formed of glass, spaced apart from the spacer plate by an air gap;

a phase matched glass-liquid crystal interface reflective coating disposed on a first side of the first substrate, the first side of the first substrate facing the liquid crystal;

a first phase matched glass-air interface anti-reflective coating disposed on a second side of the first substrate opposite its first side;

a phase matched glass-liquid crystal interface anti-reflective coating disposed on a first side of the spacer plate, the first side of the spacer plate facing the liquid crystal;

a second phase matched glass-air interface anti-reflective coating disposed on a second side of the spacer plate opposite its first side;

a phase matched glass-air interface reflective coating disposed on a first side of the second substrate, the first side of the second substrate facing a second side of the spacer plate; and a third phase matched glass-air interface anti-reflective coating disposed on a second side of the second substrate opposite its first side.

3. The liquid crystal Fabry-Perot etalon of claim 2, wherein the phase matched glass-liquid crystal interface reflective coating comprises:

tin-indium oxide transparent conductor layer disposed on the first side of the first substrate;

a reflector layer disposed over the tin-indium oxide transparent conductor layer; and an alignment layer disposed over the reflector layer.

4. The liquid crystal Fabry-Perot etalon of claim 2, wherein the phase matched glass-liquid crystal interface anti-reflective coating comprises:

a tin-indium oxide transparent conductor layer disposed on the first side of the spacer plate; and a alignment layer disposed over the tin-indium oxide transparent conductor layer.

5. The liquid crystal Fabry-Perot etalon of claim 2, wherein the etalon has an overall transmission characteristic of about 0.95 or greater.

6. The liquid crystal Fabry-Perot etalon of claim 2, wherein the phase matched glass-liquid crystal interface anti-reflective coating comprises:

a tin-indium oxide transparent conductor layer;

multiple alternating layers of $MgF_2$ and $ZrO_2$; and a nylon layer.

7. The liquid crystal Fabry-Perot etalon of claim 2, wherein the phase matched glass-liquid crystal interface reflective coating comprises:

a tin-indium oxide transparent conductor layer;

multiple alternating layers of $TiO_2$ and $SiO_2$; and a nylon layer.

8. An optical wavelength division multiplex device comprising:

two or more liquid crystal Fabry-Perot etalons connected together in a series combination, wherein each of the liquid crystal Fabry-Perot etalons comprises:

a first substrate coated on a first side with a first transparent conductor layer;

a first reflector layer disposed over the first transparent conductor layer on the first side of the first substrate;

an alignment layer disposed over the first reflector layer on the first side of the first substrate;

a spacer plate coated on a first side with a second transparent conductor layer, the first side of the spacer plate facing the first side of the first substrate, the spacer plate having a second side opposite its first side;

plural spacers disposed between the first substrate and the spacer plate to define a predetermined gap between the first substrate and the spacer plate;

liquid crystal filled in between the first substrate and the spacer plate; and a second substrate coated on a first side with a second reflector layer, the first side of the second substrate facing the second side of the spacer plate;

wherein the second substrate of each of the liquid crystal Fabry-Perot etalons is spaced a predetermined distance apart from the spacer plate.

9. An optical cross-connect comprising:

a pair of optical wavelength division multiplex devices connected via an optical network, wherein each of the optical wavelength division multiplex devices comprises:

two or more liquid crystal Fabry-Perot etalons in series combination, wherein each of the liquid crystal Fabry-Perot etalons comprises:

a first substrate coated on a first side with a first transparent conductor layer;

a first reflector layer disposed over the first transparent conductor layer on the first side of the first substrate;

an alignment layer disposed over the first reflector layer on the first side of the first substrate;

a spacer plate coated on a first side with a second transparent conductor layer, the first side of the spacer plate facing the first side of the first substrate, the spacer plate having a second side opposite its first side;

plural spacers disposed between the first substrate and the spacer plate to define a predetermined gap between the first substrate and the spacer plate;

liquid crystal filled in between the first substrate and the spacer plate; and a second substrate coated on a first side with a second reflector layer, the first side of the second substrate facing the second side of the spacer plate;

wherein the second substrate of each of the liquid crystal Fabry-Perot etalons is spaced a predetermined distance apart from the spacer plate.

10. A liquid crystal Fabry-Perot etalon comprising:

a first substrate formed of glass;

a spacer plate formed of glass;

liquid crystal disposed between the first substrate and the spacer plate;

a second substrate formed of glass, spaced apart from the spacer plate by an air gap;

a phase matched glass-liquid crystal interface reflective coating disposed on a first side of the first substrate, the first side of the first substrate facing the liquid crystal, wherein the phase matched glass-liquid crystal interface reflective coating comprises:

a first tin-indium oxide transparent conductor layer disposed on the first side of the first substrate;

a reflector layer disposed over the first tin-indium oxide transparent conductor layer; and a first alignment layer disposed over the reflector layer;

a first phase matched glass-air interface anti-reflective coating disposed on a second side of the first substrate opposite its first side;

a phase matched glass-liquid crystal interface anti-reflective coating disposed on a first side of the spacer plate, the first side of the spacer plate facing the liquid crystal, wherein the phase matched glass-liquid interface crystal anti-reflective coating comprises:

a second tin-indium oxide transparent conductor layer disposed on the first side of the spacer plate; and a second alignment layer disposed over the tin-indium oxide transparent conductor layer;

a second phase matched glass-air interface anti-reflective coating disposed on a second side of the spacer plate opposite its first side;

a phase matched glass-air interface reflective coating disposed on a first side of the second substrate, the first side of the second substrate facing a second side of the spacer plate; and a third phase matched glass-air interface anti-reflective coating disposed on a second side of the second substrate opposite its first side;

wherein the first and the second transparent tin-indium oxide conductor layers are each etched in a grid pattern so as to form multiple independent etalons.

* * * * *